(12) United States Patent
Notheis et al.

(10) Patent No.: US 7,239,780 B2
(45) Date of Patent: Jul. 3, 2007

(54) COUPLING DEVICE FOR A SOLID-STATE LASER INSTRUMENT

(75) Inventors: Thomas Notheis, Schramberg (DE); Lutz Schuler, Georgen (DE); Jürgen Döttling, Schramberg (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 11/422,442

(22) Filed: Jun. 6, 2006

(65) Prior Publication Data

US 2006/0289399 A1    Dec. 28, 2006

(30) Foreign Application Priority Data

Jun. 6, 2005    (EP)    ................................ 05012123

(51) Int. Cl.
G02B 6/44 (2006.01)
B23K 26/00 (2006.01)

(52) U.S. Cl. ..................................... 385/100; 219/121.6
(58) Field of Classification Search ................... 385/33, 385/88, 100; 219/121.6, 121.62, 121.84
See application file for complete search history.

(56) References Cited

U.S. PATENT DOCUMENTS

2001/0021295 A1* 9/2001 Yoshida ........................ 385/88
2002/0018257 A1   2/2002 Notheis ....................... 359/118

FOREIGN PATENT DOCUMENTS

GB    2 233 787    1/1991
JP    56059277    5/1981

* cited by examiner

*Primary Examiner*—Quyen Leung
(74) *Attorney, Agent, or Firm*—Fish & Richardson P.C.

(57) ABSTRACT

A device couples a laser beam into a laser light cable having a cable connection for the laser light cable. The device includes a safety element that is operable to move to a safety position only when the laser light cable is properly connected to the cable connection. The coupling device includes an optical arrangement that is controlled by the safety element, and is disposed in the beam path of the laser beam upstream of the cable connection and only directs the laser beam towards the cable connection when the safety element is in the safety position.

21 Claims, 3 Drawing Sheets

COUPLING DEVICE FOR A SOLID-STATE LASER INSTRUMENT

CROSS-REFERENCE TO RELATED APPLICATIONS

This application claims priority under 35 U.S.C. §119(a) to European Patent Application No. 05 012 123.5, filed on Jun. 6, 2005, the entire contents of which are hereby incorporated by reference.

TECHNICAL FIELD

The present invention relates to a device for coupling a laser beam into a laser light cable with a cable connection for the laser light cable.

BACKGROUND

Solid-state laser instruments for producing high laser powers (for example, several 100 W to kW) usually include an optical space and a supply unit. The optical space contains the pumping light sources, the laser resonator, beam guide components, and coupling units for coupling the laser beam into one or a plurality of laser light cables. The supply unit contains the components that are necessary for the electrical supply, for the gas and the water supply, and for control of the laser, laser components, and associated units. The optical space is usually designed as a unit that is separated from the environment by a hood of the laser instrument. The hood ensures that no laser radiation is delivered to the environment in an uncontrolled manner. The hood is therefore provided with a safety switch that causes the laser resonator to be turned off when the hood is opened.

In most cases, high-power laser instruments have a plurality of exits for the laser radiation, i.e., a plurality of coupling units for connecting laser light cables. The laser beam can thus be distributed among a plurality of workstations via beam switching arrangements or splitters that are located in the laser instrument. The coupling units for connecting the laser light cables are located in the optical space of the laser instrument. The connected laser light cables are passed out through light- and air-tight lead-throughs in the hood of the optical space.

A laser light cable should be replaced if it ages or if it sustains damage. A replacement may also be necessary if a laser light cable of a different length is required at an exit. The hood of the optical space of the laser instruments commonly is opened to plug in or unplug a laser light cable at a coupling unit. Typically, the laser is automatically turned off in this case. Moreover, the optical space is completely open with respect to the ambient air, so that dirt and dust can reach the optical components unimpeded. The laser light cable plugs of known laser instruments already have safety elements in the form of electrical contacts which, in the plugged-in state, contact corresponding connections in the socket of the coupling unit and thus close an electrical safety circuit. When the plug is withdrawn, this contact is interrupted and the laser is turned off, so that the user is not in any danger due to emerging laser radiation. However, because of the reaction time of the safety circuit, it is still possible for the laser light cable to sustain damage due to emerging radiation at the instant when the plug is withdrawn. In addition, it is inconvenient and time-consuming to shut off and then restart the laser.

SUMMARY

A coupling device is designed such that laser light is reliably prevented from emerging when the laser light cable is changed, without the source of the laser light having to be turned off for this purpose.

An optical arrangement is controlled by a safety element, and is disposed in the beam path of the laser beam upstream of a cable connection. The optical arrangement only directs the laser beam towards or through the cable connection when the safety element is in the safety position. The optical arrangement can include an optical beam switching arrangement or a closure element.

The safety element is operable to move to a safety position only when the laser light cable is properly connected to the cable connection. The safety element can be coupled to the optical arrangement such that opening of the safety element (that is, movement of the safety element away from the safety position and to a release position) results in the closure of or the directing away of the laser beam from the cable connection. For example, if the optical arrangement is an optical beam switching arrangement, the opening of the safety element can result in the directing of the laser beam toward an absorber. As another example, if the optical arrangement is a closure element, the opening of the safety element can result in the closure of beam path of the laser beam. In this way, the laser light is directed only into the cable connection when there is a correct connection between the laser light cable and the cable connection.

In another implementation, the safety element is formed to lock the correct connection between the laser light cable and the cable connection. For this purpose, the laser light cable and the cable connection can be fixed to one another in the correct connection by means of a locking element that can only be unlocked when the safety element is in a release position. This ensures that, when changing a light guide cable, the safety element must first be opened into its release position, which prevents the laser beam from exiting the cable connection by way of the optical arrangement. Only then can the locking element be unlocked and the laser light cable removed from the cable connection.

In this way, the laser beam is directed away from the cable connection at the very instant when the light guide cable is released from the connection with the cable connection. The coupling between the safety element and the locking element can be formed mechanically or electrically. Thus, in certain implementations, the locking element can be mechanically released by opening the safety element and can be moved out of its locking position into an unlocking position, so that the laser light cable can be unplugged from the cable connection. In another implementation, an electrical coupling between the safety and the locking element takes place, for example, by way of an electrical signal line and a control device that only releases the locking element for unlocking when the safety element is not in its safety position.

The coupling device can include a plug that is plugged into the cable connection or a closure sleeve provided at a socket of the cable connection for the plug of the laser light cable to be retained in its locking position by the locking element.

In another implementation, the coupling device includes a safety element that is formed such that it automatically opens when the correct connection between the laser light cable and the cable connection is interrupted. The safety element can, for example, be an electrically conductive contact that is provided at the plug and that, when there is a correct connection between the laser light cable and the cable connection, contacts an electrically conductive contact disposed at a socket of the cable connection and as a result switches the optical arrangement.

The safety element and the optical arrangement can be coupled together mechanically or electrically. In the latter case, an electrical safety circuit associated with the coupling device is opened by opening the safety element. Thus, if the optical arrangement is a switching arrangement, then when the safety circuit is opened, the switching arrangement, which directs the laser beam into the cable connection, is automatically checked as to its position by a control device and, if applicable, opened or adjusted, so that the laser beam is directed into an absorber rather than into the cable connection. If the optical arrangement is a closure element, then the closure element is automatically checked as to its position by a control device and, if applicable, closed, so that the laser beam does not enter the cable connection.

The cable connection and the optical arrangement can be separated from one another in a light- and an air-tight manner by a wall, so that the optical components that are located in the beam path upstream of the cable connection are not accessible when the laser light cable is changed and are thus protected against damage and soiling.

In another general aspect, a distributor includes a plurality of coupling devices formed as described above for distributing a laser beam among a plurality of laser light cables. A laser beam from a laser source can be coupled in, e.g., by way of a laser light cable, at an input side in the distributor and afterwards distributed by way of beam splitters or optical arrangements among a plurality of laser light cables that are connected on an output side. The coupling devices also ensure that the laser beam is not directed into a laser light cable that is to be changed in the case of a distributor of this kind. Each laser light cable that is connected to the distributor can be plugged in or unplugged individually without impairing the operation of further connected laser light cables and without the laser light source having to be turned off for this purpose.

In another general aspect, a solid-state laser instrument includes a laser resonator disposed in a housing and one or more coupling devices formed as above for coupling the laser beam of the laser resonator into one or more laser light cables. This laser instrument has the advantage of enabling individual laser light cables to be plugged in or unplugged without any danger to the user and without the laser having to be turned off for this purpose. It is thus possible, while changing a laser light cable, to continue working at workstations that are connected to the laser instrument by way of other laser light cables. Any laser light cable at any desired coupling unit of the laser instrument can be individually plugged in or unplugged without impairing the operation of further laser light cables.

Each cable connection of the one or more coupling devices can be provided outside of the housing, for example, on the outside of the housing. Thus, it is not necessary to open the housing of the laser resonator, i.e., the easily soiled optical space, in order to plug in or unplug a laser light cable. In this way, the user can be less meticulous with regard to soiling of or damage to optical components.

In another general aspect, the invention features methods of coupling a laser beam from a laser into a laser light cable by establishing a correct connection between the laser light cable and a cable connection if a safety element is in a closed position, and upon opening of the safety element, preventing the laser beam from exiting the cable connection at a location upstream of the cable connection without having to turn off the laser. The method also includes enabling the laser light cable to be disconnected from the cable connection upon opening of the safety element.

Implementations can include one or more of the following features. For example, opening of the safety element can includes opening an electrical circuit.

Preventing the laser beam from entering the cable connection can include directing the laser beam away from the cable connection with an optical switching arrangement. Preventing the laser beam from entering the cable connection can include directing the laser beam toward an absorber. Preventing the laser beam from entering the cable connection can include closing a beam path of the laser beam with a closure element.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Further advantages will emerge from the description and the drawings. It is equally possible to use the features mentioned above and those listed in the following by themselves or in a plurality in any desired combinations. The embodiments that are shown and described are not to be understood as a definitive list, being rather of an exemplary nature for describing the invention.

DESCRIPTION OF THE DRAWINGS

Like reference symbols in the various drawings may indicate like elements.

DETAILED DESCRIPTION

Figure 1:
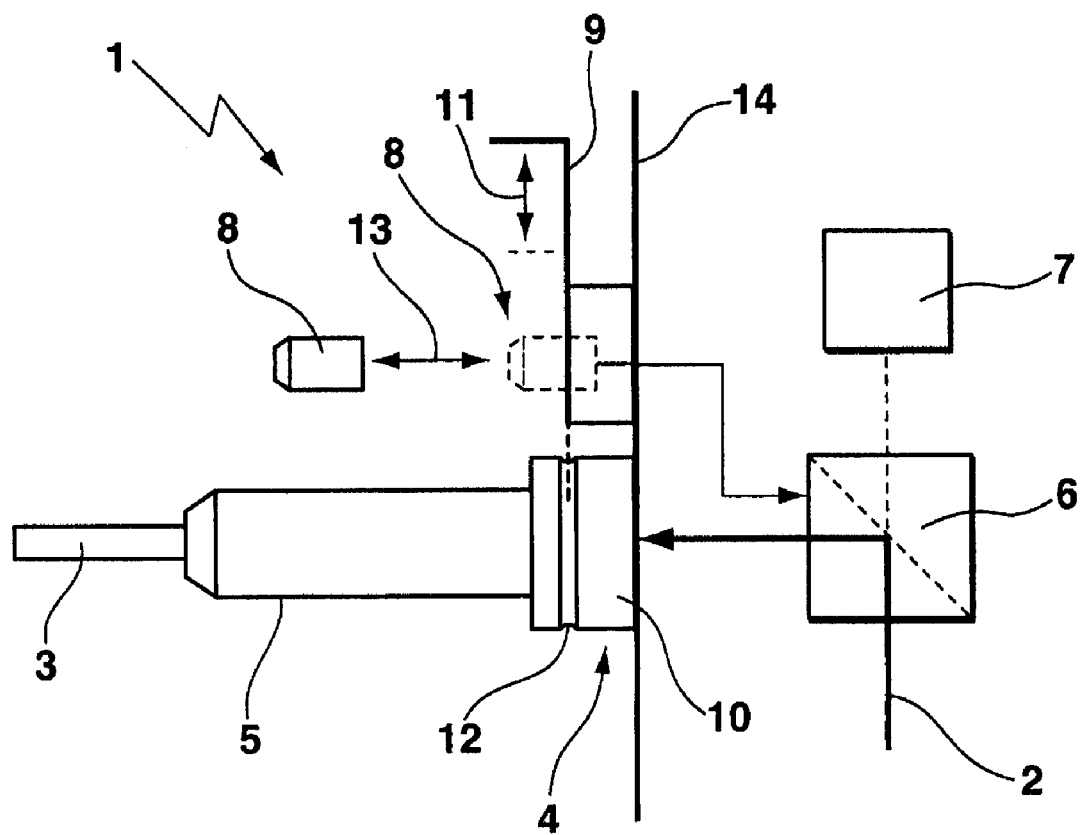
FIG. 1 is a diagram of a first embodiment of the coupling device.

FIG. 1 shows a device 1 that couples a laser beam 2 into a laser light cable 3. The coupling device 1 includes a cable connection 4, which is formed as a socket and into which a plug 5 of the laser light cable 3 is plugged, and an optical beam switching arrangement 6, which is disposed in the beam path of the laser beam 2 upstream of the cable connection 4 and that directs the laser beam 2 either towards the cable connection 4 or into an absorber 7. The coupling device also includes a safety element 8 for controlling the beam switching arrangement 6 as well as a locking element 9 for locking the plug-and-socket connection between the plug 5 and the cable connection 4. The plug 5 works like a normal mechanical plug connection and is typically made of metal. The absorber 7 can be made of an laser absorbing material, including metal, e.g., platinum, or a carbon or ceramic material.

As shown in FIG. 1, the safety element 8 can be configured as a separate plug, e.g., of metal, which, in its safety position, locks the locking element 9, and closes a standard electrical safety circuit (not shown). The safety element and the locking element can be coupled together electrically and/or mechanically.

The plug 5 is locked in the cable connection 4 by means of a sleeve 10 that can be displaced on the cable connection 4 and that is displaced by the operator in the direction of the beam switching arrangement 6 to release the plug-and-socket connection. In its locking position, which is represented by a broken line, the locking element 9, which can be displaced in the direction of the double arrow 11, prevents the sleeve 10 from being displaced by engaging an annular groove 12 that is provided at the circumference of the sleeve. The locking element 9 is locked in its locking position by the safety element 8, which is formed as a withdrawal plug (double arrow 13). The coupling device 1 also has a partition wall 14 that separates the cable connection 4, which is accessible to the operator, and the beam switching arrangement 6 from one another in a light- and an air-tight manner.

The mode of operation of the coupling device 1 for releasing the plug-and-socket connection is as follows. An electrical safety circuit (not shown), which is associated with the coupling device 1, is opened by opening the safety element 8, i.e., by moving (or withdrawing) the safety element 8 from its safety position, which is represented by broken lines, into its release position, which is represented by solid lines. When the safety circuit is opened, the beam switching arrangement 6 is automatically checked as to its position and, if applicable, switched, so that the laser beam 2 is directed into the absorber 7 rather than towards the cable connection 4. The mechanical lock of the locking element 9 is in addition released by opening the safety element 8, and the locking element can now be moved out of its locking position represented by a broken line into its unlocking position represented by a solid line. In this unlocking position the sleeve 10 can be displaced in the direction of the beam switching arrangement 6 and the laser light cable 3 thereby unplugged from the cable connection 4.

Figure 2:
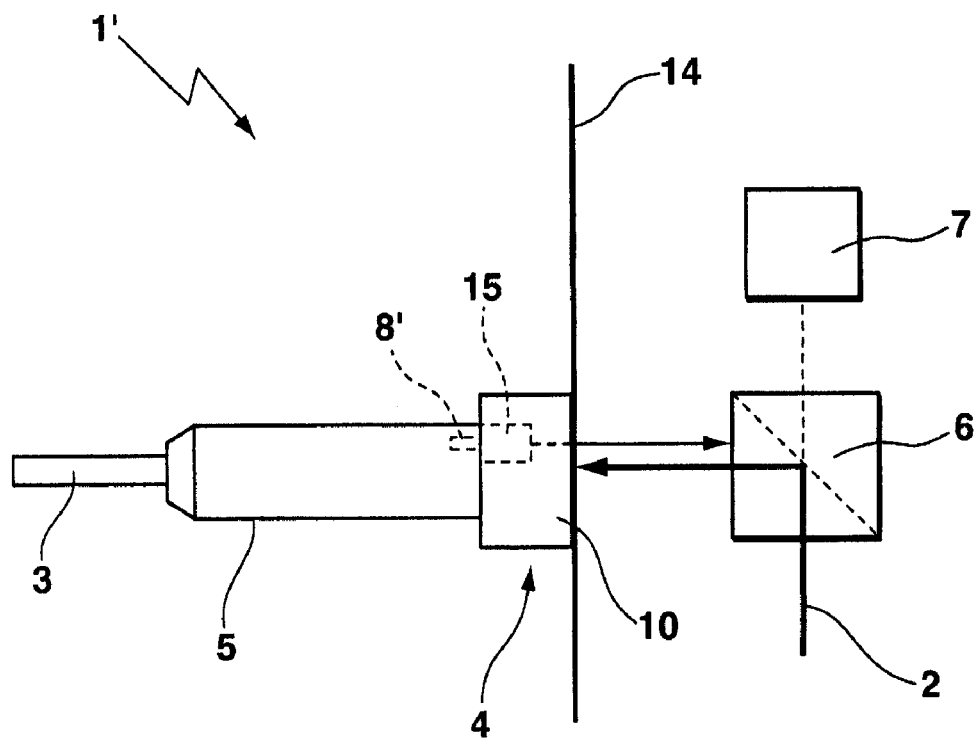
FIG. 2 is a diagram of a second embodiment of the coupling device.

FIG. 2 shows a coupling device 1' that differs from the coupling device 1 in that the safety element 8' is an electrically conductive contact that is provided at the plug 5 and that, when there is a correct connection between the laser light cable 3 and the cable connection 4, contacts an electrically conductive contact 15 disposed at the socket of the cable connection 4. When the plug 5 is withdrawn, i.e., by interrupting the correct connection between the laser light cable 3 and the cable connection 4, the beam switching arrangement 6 is automatically checked as to its position and, if applicable, switched and the laser beam 2 is therefore directed towards the absorber 7.

Figure 3:
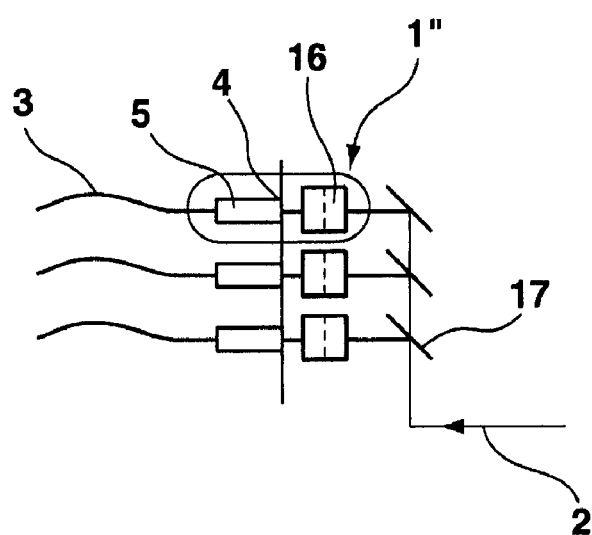
FIG. 3 is a diagram of a third embodiment of the coupling device.

Referring to FIG. 3, a coupling device 1" includes a closure element 16, which is controlled by the safety element 8, 8', which is not shown in FIG. 3 (but is in the same general location as in FIGS. 1 and 2), is disposed in the beam path of the laser beam 2 upstream of the cable connection 4. The closure element 16 lets the laser beam 2 through to the cable connection 4 only when the safety element 8, 8' is in the safety position. The safety element 8, 8' is in this case coupled to the closure element 16 such that opening of the safety element 8, 8' results in the closure of the beam path through the closure element 16. The closure element 16 is constructed, for example, as a cooled absorbing shutter or as a deflecting mirror that can be pivoted into the laser beam 2 and that deflects the laser beam 2 into an absorber, which is not shown here. As shown in FIG. 3, the laser beam 2 is distributed among three coupling devices 1" by way of beam splitters 17.

Figure 4:
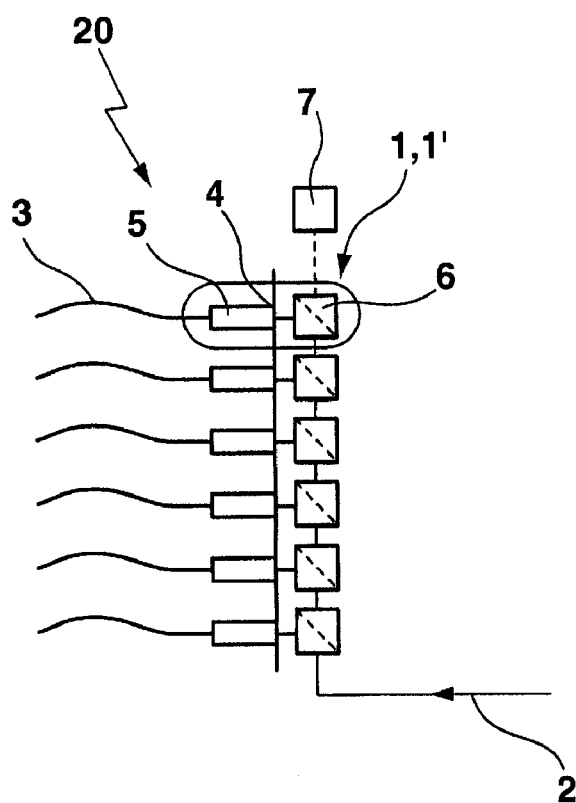
FIG. 4 is a diagram of a distributor with a plurality of coupling devices in each case formed as in FIG. 1 or FIG. 2.

FIG. 4 shows a distributor 20 with six coupling devices 1, 1' formed as in FIG. 1 or as in FIG. 2 for distributing a laser beam 2 among the cable connections 4 of the coupling devices 1, 1'. The beam switching arrangements 6 are switched consecutively in time in order to direct the laser beam 2 consecutively in time towards the laser light cables 3 connected at the time.

Figure 5:
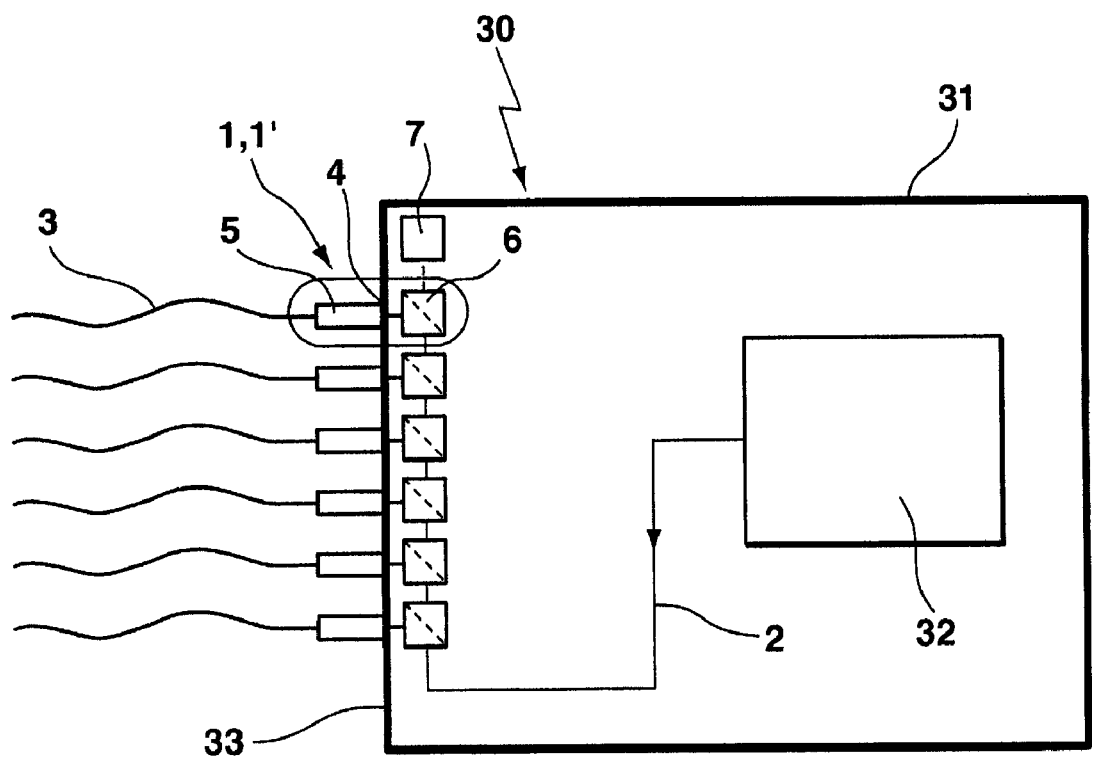
FIG. 5 is a diagram of a solid-state laser instrument with a plurality of coupling devices in each case formed as in FIG. 1 or FIG. 2.

FIG. 5 shows a solid-state laser instrument 30 including a laser resonator 32, which is disposed in a housing (optical space) 31 closed in a light- and an air-tight manner, and with six coupling devices 1, 1' formed as in FIG. 1 or as in FIG. 2 for distributing the laser beam 2 of the laser resonator 32 among the cable connections 4 of the coupling devices 1, 1'. All the optical components of the laser instrument 30, such as, e.g., the laser resonator 32 and the beam switching arrangements 6, are located in the housing 31. The cable connections 4 are disposed outside of the housing 31, namely at a gas tight wall 33, which consists, for example, of varnished steel, of the housing 31 and are accessible from outside by way of a separate flap (not shown) that can be opened while the laser is operating without the latter being turned off.

The distributor 20 and the solid-state laser instrument 30 may also or alternatively include the coupling devices 1" instead of the coupling devices 1 or 1' in order to distribute the laser beam 2 among the cable connections 4.

The new coupling devices can be used as follows to couple the laser beam from the laser into the laser light cable. The safety element 8 (or 8') can be moved to the safety position (that is, the position shown by the dashed line in FIG. 1) only if the laser light cable 3 is properly connected to the cable connection 4. The safety element 8 is moved to a release position (that is, the position shown by the solid line in FIG. 1) that is not the safety position to enable the laser light cable 3 to be disconnected from the cable connection 4. When the safety element is in the release position, an electrical circuit is opened, and the optical arrangement (for example, the switching arrangement 6 or the closure element 16) prevents the laser beam from entering the cable connection 4 at a location upstream of the cable connection 4 without having to turn off the laser. Moreover, the optical arrangement is arranged such that it only directs the laser beam towards the cable connection 4 when and if the safety element 8 is in the safety position.

In one implementation, the laser beam is prevented from entering the cable connection 4 by directing the laser beam away from the cable connection 4 with the optical switching arrangement 6. In another implementation, the laser beam is prevented from entering the cable connection 4 by directing the laser beam toward the absorber 7. In another implementation, the laser beam is prevented from entering the cable connection 4 by closing a beam path of the laser beam with the closure element 16.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A device for coupling a laser beam into a laser light cable, the device comprising:
   a cable connection for the laser light cable,
   a safety element that is operable to move to a safety position only when the laser light cable is properly connected to the cable connection, and
   an optical arrangement that is controlled by the safety element and is disposed in the beam path of the laser beam upstream of the cable connection and directs the laser beam towards or through the cable connection only when the safety element is in the safety position.

2. The coupling device of claim 1, wherein the optical arrangement comprises a switching arrangement.

3. The coupling device of claim 1, wherein the optical arrangement comprises a closure element.

4. The coupling device of claim 1, wherein the safety element is formed to lock the laser light cable to the cable connection when the safety element is in the safety position.

5. The coupling device of claim 4, wherein the laser light cable and the cable connection are locked to one another by means of a locking element that can be unlocked only when the safety element is in a release position that is not the safety position.

6. The coupling device of claim 5, wherein the safety element and the locking element are coupled together electrically or mechanically.

7. The coupling device of claim 5, further comprising a plug coupled to the laser light cable and being plugged into the cable connection, wherein the plug is arrested by the locking element when the locking element is in a locking position.

8. The coupling device of claim 5, further comprising a closure sleeve provided at a socket of the cable connection for the plug of the laser light cable, wherein the closure sleeve is arrested by the locking element when the locking element is in a locking position.

9. The coupling device of claim 1, wherein the safety element is formed such that it must be opened to disconnect the laser light cable from the cable connection.

10. The coupling device of claim 9, wherein the safety element is an electrically conductive contact that is provided at the laser light cable and that, when it is in the safety position, contacts an electrically conductive contact disposed at a socket of the cable connection.

11. The coupling device of claim 1, wherein the safety element and the optical arrangement are coupled together electrically or mechanically.

12. The coupling device of claim 1, further comprising an absorber for receiving the laser beam when the laser beam is directed away from the cable connection by the optical arrangement.

13. The coupling device of claim 1, wherein the cable connection and the optical arrangement are separated from one another in a light- and an air-tight manner by a wall.

14. A distributor for distributing a laser beam among a plurality of laser light cables comprising a respective coupling device of claim 1 for each laser light cable.

15. A solid-state laser instrument comprising:
    a laser resonator disposed in a housing, and
    one or more coupling devices of claim 1 for coupling the laser beam of the laser resonator into one or more of laser light cables.

16. A solid-state laser instrument according to claim 15, wherein each cable connection of the one or more coupling devices is provided outside of the housing.

17. A method of coupling a laser beam from a laser into a laser light cable, the method comprising:
    moving a safety element to a safety position only if the laser light cable is properly connected to a cable connection;
    moving the safety element to a release position that is not the safety position to enable the laser light cable to be disconnected from the cable connection; and
    preventing the laser beam from entering the cable connection at a location upstream of the cable connection without having to turn off the laser if the safety element is in the release position.

18. The method of claim 17, wherein moving the safety element to a release position causes the opening of an electrical circuit.

19. The method of claim 17, wherein preventing the laser beam from entering the cable connection includes directing the laser beam away from the cable connection with an optical switching arrangement.

20. The method of claim 19, wherein preventing the laser beam from entering the cable connection includes directing the laser beam toward an absorber.

21. The method of claim 17, wherein preventing the laser beam from entering the cable connection includes closing a beam path of the laser beam with a closure element.

* * * * *

UNITED STATES PATENT AND TRADEMARK OFFICE
CERTIFICATE OF CORRECTION

| | |
|---|---|
| PATENT NO. | : 7,239,780 B2 |
| APPLICATION NO. | : 11/422442 |
| DATED | : July 3, 2007 |
| INVENTOR(S) | : Thomas Notheis, Lutz Schuler and Jürgen Dötting |

It is certified that error appears in the above-identified patent and that said Letters Patent is hereby corrected as shown below:

On the Title page, under FOREIGN PATENT DOCUMENTS, reference "JP 56059277" should be --JP 56059211--.

Signed and Sealed this

Fourteenth Day of August, 2007

JON W. DUDAS
*Director of the United States Patent and Trademark Office*